United States Patent [19]

McClintock

[11] 4,264,388

[45] * Apr. 28, 1981

[54] METHOD FOR APPLICATION OF COMPOSITE PRESSURE SENSITIVE ADHESIVE

[75] Inventor: Jack M. McClintock, Stow, Ohio

[73] Assignee: Morgan Adhesives Co., Stow, Ohio

[*] Notice: The portion of the term of this patent subsequent to Jun. 5, 1996, has been disclaimed.

[21] Appl. No.: 38,679

[22] Filed: May 14, 1979

Related U.S. Application Data

[63] Continuation-in-part of Ser. No. 837,828, Sep. 29, 1977, Pat. No. 4,157,410.

[51] Int. Cl.³ .................. B32B 31/00; B32B 7/02; C09J 7/02; A61F 13/02
[52] U.S. Cl. .................. 156/152; 156/249; 156/289; 156/313; 428/40; 428/215; 428/352; 428/354
[58] Field of Search .............. 428/40, 41, 42, 212, 428/213, 214, 215, 216, 352, 354, 906; 156/289, 234, 235, 239, 241, 152, 247, 249, 313

[56] References Cited

U.S. PATENT DOCUMENTS

| | | | |
|---|---|---|---|
| 2,717,848 | 9/1955 | Jaye | 138/157 |
| 3,257,228 | 6/1966 | Reed | 428/40 |
| 3,332,829 | 7/1967 | Avery | 428/40 |
| 3,411,978 | 11/1968 | Frobach et al. | 428/42 |
| 3,471,357 | 10/1969 | Bildusas | 156/241 |
| 3,556,894 | 1/1971 | Bernard | 428/40 |
| 3,664,910 | 5/1972 | Hollie | 428/40 |
| 3,896,249 | 7/1975 | Keeling et al. | 428/352 |
| 3,985,602 | 10/1976 | Stuart | 156/235 |
| 3,995,087 | 11/1976 | Desanzo | 428/40 |
| 4,020,842 | 5/1977 | Richman et al. | 428/40 |
| 4,022,248 | 5/1977 | Hepner et al. | 428/40 |
| 4,041,201 | 8/1977 | Würker | 428/40 |
| 4,157,410 | 6/1979 | McClintock | 428/40 |
| 4,158,587 | 6/1979 | Keller et al. | 156/239 |

Primary Examiner—William R. Dixon, Jr.
Attorney, Agent, or Firm—Oldham, Oldham, Hudak & Weber Co.

[57] ABSTRACT

A composite pressure sensitive adhesive construction contains a central release liner, a layer of an adhesive on each side thereof, and an exterior release liner on at least one of the adhesive layers. The central release liner and the exterior release liner contain release coatings on surfaces thereof which contact the adhesive layer. The composite construction may be made up in the form of a roll for easy dispensing or in the form of a precut tape. The pressure sensitive adhesive construction is generally useful for making any type of sealing connection wherein an initial releasable connection is desired. For example, the pressure sensitive adhesive construction may be utilized in sealing pipe insulating jackets wherein the exterior release liners are removed and the adhesive construction is applied to the opposite longitudinal ends or sides of the insulating jacket cover. The insulating jacket may then be stored until utilized whereupon the central release liner is removed, the jacket inserted about the pipe, and a sealing connection then made by pressing the two exposed adhesive layers together. Alternatively, the adhesive may be applied through rolling, spraying, or painting directly to both opposite longitudinal ends or sides of the jacket cover, the two applied adhesive layers being separated by the interposition of the central release liner during storage.

40 Claims, 11 Drawing Figures

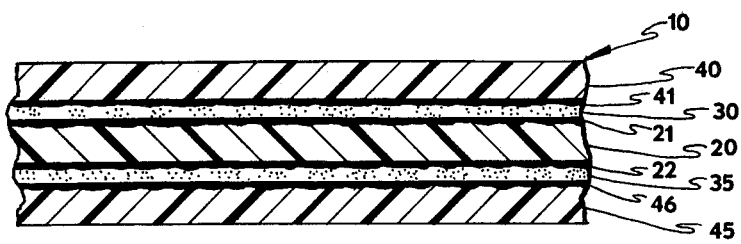
FIG. 1
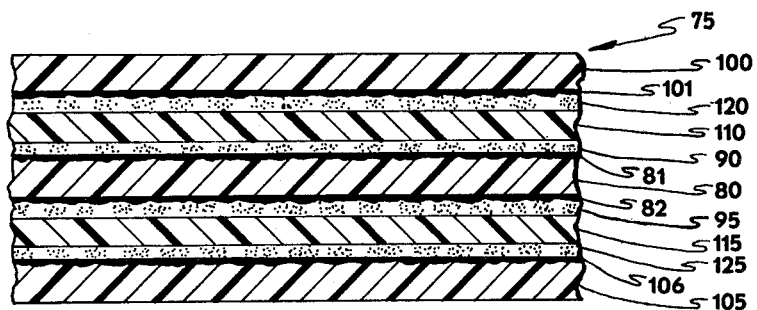
FIG. 2
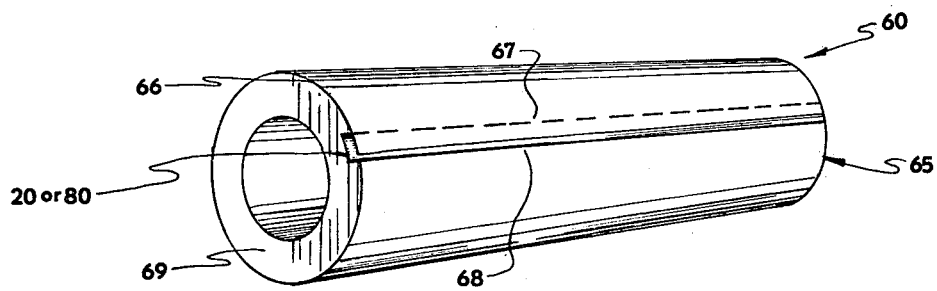
FIG. 3
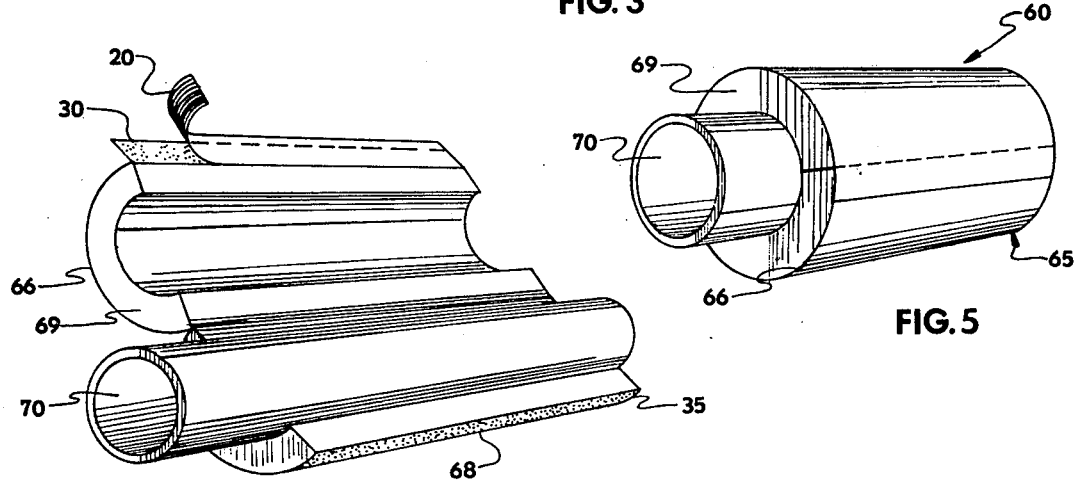
FIG. 4
FIG. 5

METHOD FOR APPLICATION OF COMPOSITE PRESSURE SENSITIVE ADHESIVE

CROSS-REFERENCE

This application is a continuation-in-part application of my copending United States patent application bearing Ser. No. 837,828 which was filed on Sept. 29, 1977, now U.S. Pat. No. 4,157,410 entitled "A COMPOSITE PRESSURE SENSITIVE ADHESIVE CONSTRUCTION."

BACKGROUND OF THE INVENTION

The present invention relates to specific embodiments of a composite pressure sensitive adhesive construction which is releasable until a permanent seal is desirable. More specifically, the present invention relates to said composite pressure sensitive adhesive constructions which are very readily applied to any container, package, seam, or other item wherein an initial resealable connection is desired, followed by a later permanent-type bond.

Heretofore, various articles or methods have been utilized to join items together. One of the most common articles or methods has been the use of staples, paste, glue, and more recently, pressure sensitive tapes. However, often it is highly desirable to temporarily hold the items together. This renders the use of paste and glue impossible in that any separation after the paste and glue have been applied results in the destruction of a portion of the article. Similarly, the removal of staples will often tear a portion of the article.

Considering pressure sensitive adhesives, various techniques have been utilized and they generally are cumbersome, expensive, and result in a poor quality seal. For example, in the bonding or sealing together of two pieces of material such as the two cover edges of a pipe insulating jacket, paste or glue is highly undesirable in that the edges must first be cleaned, the paste applied, and the edges then held together for a period of time while the paste or glue dries. In addition to this, the installation is often in a very difficult work area, such as a ceiling, which requires an individual operating at the top of a high ladder.

One current method utilizing pressure sensitive adhesives involves a double face coated tape, that is, a tape system having a carrier, adhesive layers applied to both sides of the carrier, and release liners applied to the adhesive layers. One of the release liners would normally be removed so that the tape could be attached to one edge of the jacket or to the item. Upon installation, the remaining release liner would be removed and the adhesive contacted with the other edge. However, this method generally resulted in poor adhesion in that the remaining edge usually acquired dust, dirt, grease, and the like, either during warehousing, shipment, or installation.

Another system utilized heretofire is commonly called the "two-tape" method. According to this system, each tape contained a carrier having an adhesive layer on each side thereof. To each adhesive layer was added a release liner. One of the adhesive faces on each tape was added to each edge of the material either at the factory or on the job. If added on the job, the same problems set forth above were encountered in that the edges would be dirty, greasy, or the like, thus, a good bond of the tape generally was not obtained. Furthermore, an exact registration was difficult to obtain since the on-the-job application often involved working under difficult conditions. If one of the adhesive layers on each of the two tapes was applied to each edge during factory installation, a temporary bond of each edge to each other was not obtained, since, of course, the two remaining release layers would not adhere to each other. Thus, the item such as an insulated coolant or steam pipe jacket would freely open and was subject to abuse, damage, and the like, and further required the need to remove two liners.

SUMMARY OF THE INVENTION

It is, therefore, an object of the present invention to provide a composite pressure sensitive adhesive construction for adhereing one item to another.

It is another object of the present invention to provide a composite pressure sensitive adhesive construction, as above, wherein a one-tape system is utilized which requires a minimum amount of work for installation.

It is a further object of the present invention to provide a composite pressure sensitive adhesive construction, as above wherein a resealable or a temporary seal is maintained which does not damage or affect any part of the adhered items until a permanent seal is desired.

It is an additional object of the present invention to provide a composite pressure sensitive adhesive construction, as above, wherein clean, dirt-free edges of different items or the same items joined or adhered together are maintained prior to the formation of the permanent seal, thereby assuring an effective permanent seal.

It is yet another object of the present invention to provide a composite pressure sensitive adhesive construction, as above, wherein a temporary seal is converted to a permanent seal by the removal of only a single release liner.

It is yet a further object of the present invention to provide a composite pressure sensitive adhesive construction, as aboe, wherein said single release liner is a differential release liner.

It is yet another object of the present invention to provide a composite pressure sensitive adhesive construction, as above, wherein said construction may be made up in the form of a roll or in the form of precut tapes.

It is yet another object of the present invention to provide a composite pressure sensitive adhesive construction, as above, wherein the temporary seal is maintained by the differential release liner interposed between adhesive layers applied to the items to be joined.

These and other objects of the present invention will become apparent from the following specification which describes in detail the embodiments without attempting to discuss all of the modifications in which the invention might be embodied.

Generally, a method of adhering one item to another item through a composite pressure sensitive adhesive construction, comprises the steps of: applying a first pressure sensitive adhesive layer to one item; releasably attaching a central release liner to said first pressure sensitive adhesive layer; applying a second pressure sensitive adhesive layer to another item, said second adhesive layer releasably attached to the remaining side of said central release liner; and removing said first pressure sensitive adhesive layer to said second pressure sensitive adhesive layer to form a bond.

Additionally, a method of adhering one item to another item through a composite pressure sensitive adhesive construction, comprises the steps of: applying a first adhesive layer to one item; securing a carrier cushion layer to said first adhesive layer; applying a second pressure sensitive adhesive layer to said carrier cushion layer; releasably attaching a central release liner to said second adhesive layer; applying a fourth adhesive layer to another item; securing a second carrier cushion layer to said fourth adhesive layer; applying a third pressure sensitive adhesive layer to said second carrier layer, said third pressure sensitive adhesive layer releasably attached to said central release liner; and removing said central release liner and contacting said second pressure sensitive adhesive layer with said third pressure sensitive adhesive layer to form a bond.

Additionally, a method of adhering one item to another through a composite pressure sensitive adhesive construction, comprises the steps of: applying a first adhesive layer to one item; applying a fourth adhesive layer to another item; applying a second pressure sensitive adhesive layer to a carrier layer and a central release liner, one side of said second pressure sensitive adhesive layer attached to said carrier layer and the remaining side of said second pressure sensitive adhesive layer releasably attached to said central release liner; applying a third pressure sensitive adhesive layer to said central release liner and a second carrier layer, one side of said third pressure sensitive adhesive layer attached to said second carrier layer and the remaining side of said third pressure sensitive adhesive layer releasably attached to said central release liner to form an intermediate composite pressure sensitive adhesive construction; securing said intermediate composite pressure sensitive adhesive construction to said first adhesive layer and said fourth adhesive layer; and removing said central release liner and contacting said second pressure sensitive adhesive layer with said third pressure sensitive adhesive layer to form a bond.

Additionally, a method of adhering one item to another through a composite pressure sensitive construction, comprises the steps of: applying a first pressure sensitive adhesive layer to one item; releasably attaching a central release liner to said first pressure sensitive adhesive layer; applying a second pressure sensitive adhesive layer to said central release liner; releasably attaching an external release liner on its contact side to said second pressure sensitive adhesive layer to protect the composite pressure sensitive adhesive construction during storage; removing said external release liner and contacting said second pressure sensitive adhesive layer to another item; and removing said central release liner and contacting said first pressure sensitive adhesive layer and said second pressure sensitive adhesive layer to form a bond.

Additionally, a method of adhering one item to another through a composite pressure sensitive adhesive construction, comprises the steps of: applying a first adhesive layer to one item; securing a carrier cushion layer to said first adhesive layer; applying a second pressure sensitive adhesive layer to said carrier cushion layer; releasably attaching a central release liner to said second pressure sensitive adhesive layer; applying a third pressure sensitive adhesive layer to said central release liner; securing a second carrier cushion layer to said third pressure sensitive adhesive layer; applying a fourth pressure sensitive adhesive layer to said second carrier cushion layer; releasably attaching an external release liner on its contact side to said fourth pressure sensitive adhesive layer to protect the composite pressure sensitive adhesive construction during storage; removing said external release liner and contacting said fourth pressure sensitive adhesive layer to another item; and removing said central release liner and contacting said second pressure sensitive adhesive layer with said third pressure sensitive adhesive layer to form a bond.

Additionally, a method of adhering one item to another through a composite pressure sensitive adhesive construction, comprises the steps of: applying a first adhesive layer to one item; applying a second pressure sensitive adhesive layer to a carrier layer and a central release liner, one side of said second pressure sensitive adhesive layer attached to said carrier layer and the remaining side of said second pressure sensitive adhesive layer releasably attached to said central release liner; applying a third pressure sensitive adhesive layer to said central release liner and a second carrier layer, one side of said third pressure sensitive adhesive layer releasably attached to said central release liner to form an intermediate composite pressure sensitive adhesive construction; securing said intermediate composite pressure sensitive adhesive construction to said first adhesive layer; applying a fourth pressure sensitive adhesive layer to the remaining side of said second carrier layer; releasably attaching an external release liner on its contact side to said fourth pressure sensitive adhesive layer to protect the composite pressure sensitive adhesive construction during storage; removing said external release liner and contacting said fourth pressure sensitive adhesive layer with another item; and removing said central release liner and contacting said second pressure sensitive adhesive layer with said third pressure sensitive adhesive layer to form a bond.

Generally, a composite pressure sensitive adhesive construction, comprises: (a) a pressure sensitive adhesive layer; (b) a central release liner having two sides; (c) a second pressure sensitive adhesive layer; and (d) an exterior release liner having a contact side; one side of said central release liner releasably attached to said first pressure sensitive adhesive layer and the remaining side of said central release liner releasably attached to said second pressure sensitive adhesive layer; and said contact side of said exterior release liner releasably attached to said second pressure sensitive adhesive layer.

Additionally, a composite pressure sensitive construction, comprises: (a) a first adhesive layer; (b) a carrier layer having two sides; (c) a second pressure sensitive adhesive layer; (d) a central release liner having two sides; (e) a third pressure sensitive adhesive layer; (f) a second carrier layer having two sides; (g) a fourth pressure sensitive adhesive layer; and (h) an exterior release liner having a contact side; one side of said first carrier layer attached to said first adhesive layer and the remaining side of said first carrier layer attached to said second pressure sensitive adhesive layer; one side of said central release liner releasably attached to said second pressure sensitive adhesive layer and the remaining side of said central release liner releasably attached to said third pressure sensitive adhesive layer; one side of said second carrier layer attached to said third pressure sensitive adhesive layer and the remaining side of said second carrier layer attached to said fourth pressure sensitive adhesive layer; and said contact side of said exterior release liner releasably attached to said fourth pressure sensitive adhesive layer.

BRIEF DESCRIPTION OF THE DRAWINGS

FIG. 1 is a cross-sectional view of one embodiment of a composite pressure sensitive adhesive construction according to the present invention.

FIG. 2 is a cross-sectional view of another embodiment of a composite pressure sensitive adhesive construction according to the present invention.

FIG. 3 is a plan view of a pipe insulation jacket having the composite pressure sensitive adhesive construction of the present invention joining two ends of the insulating jacket cover.

FIG. 4 is a plan view showing the insulation jacket in an open position with a pipe in one section thereof, an exposed pressure sensitive adhesive layer to one longitudinal end portion of the cover and the partial removal of a central release liner thereby exposing another pressure sensitive adhesive layer on the remaining longitudinal end portion of the cover.

FIG. 5 is a plan view showing the insulation jacket in a closed position about a pipe wherein one longitudinal end portion of the cover has been bonded to the other longitudinal portion of the cover through the pressure sensitive adhesive layers.

PREFERRED EMBODIMENTS OF THE INVENTION

Figure 6:
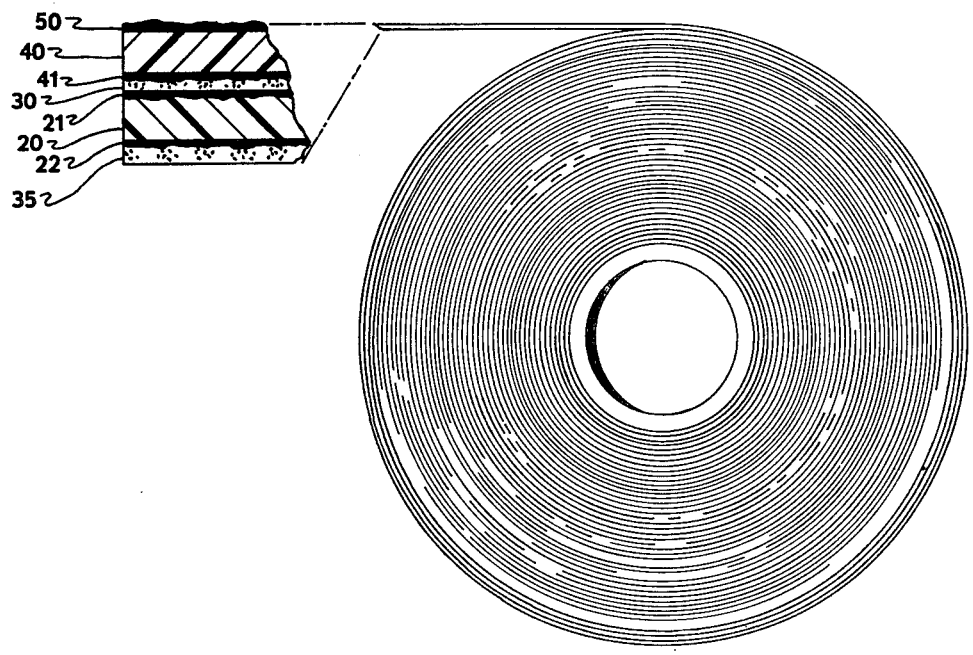
FIG. 6 is a side view showing a composite pressure sensitive adhesive construction similar to FIG. 1 in the form of a self-wound roll.

According to the concepts of the present invention, a composite pressure sensitive adhesive construction is provided temporarily joining one item to another until a permanent bond is desired. The pressure sensitive adhesive construction has a central release liner with a pressure sensitive adhesive layer releasably attached to each side thereof. An exterior release liner is releasably attached to usually one of the two exposed adhesive layers as when the construction is in the form of a roll, or usually to both of the adhesive layers as when the construction is in the form of a tape. Under clean and quality control conditions, two items may be fastened together through the use of the composite pressure sensitive adhesive constructions. That is, under such conditions, when a construction is utilized in the form of a roll, the first exposed adhesive layer may be applied to any item and then the single exterior release liner may be removed thereby exposing the second adhesive layer which is applied to another item. It the adhesive construction is in the form of a tape, the first exterior release liner is removed and applied to a surface of an item and similarly, the second exterior release liner may be removed with the exposed pressure sensitive adhesive then applied to a second edge or surface of an item. Thus, regardless of the construction utilized, the two edges or surfaces of the same or different items will then be temporarily connected to each other through the pressure sensitive adhesive construction. When a permanent bond is desired, the central release liner is removed, thereby exposing the two remaining sides of the adhesive layers which are then bonded together as through the application of pressure. In other embodiments, a carrier layer with an adhesive layer on one side thereof may be added to the original adhesive layer existing on each side of the central release layer. The application of such a construction to an item or article is similar as in the formation of a permanent bond. Such an embodiment provides bulk or a cushioned construction which is often desirable.

FIG. 1 discloses a preferred embodiment of the invention wherein a composite pressure sensitive adhesive construction is shown, generally indicated by the numeral 10. The composite construction has a central release liner 20 which is coated on each side thereof as at 21 and 22 with a release coating. Generally, any conventional release coating may be utilized such as a silicone coating. Central release liner 20 may vary in thickness from about $\frac{1}{2}$ mil to about 5 or 6 mils or higher with thicknesses in excess of this range generally being impracticable due to cost and flexibility. A desirable thickness, in most instances, is from about 1 to 4 mils and preferably 3 to 4 mils when utilized in connection with a pipe jacket. Various common materials and/or films may be utilized for central release liner 20 such as Super Calendered Kraft Paper, polyethylene-coated paper, polyethylene film, polyester films, polyvinyl films, polypropylene films, and the like. The thickness of release coatings 21 and 22 are very small and theoretically need only be a molecule thick so long as the liner is substantially covered. Hence, such release coatings are generally applied by Rotogravure printing, Mayer rod coating, or the like, and are barely measureable, that is, generally being well under 1/10 of a mil. Release coating layers 21 and 22 may be the same material or may be slightly different types of material to affect a tighter release on one side with an easier release on the other side, that is, a differential release. Such a differential release liner is preferred in the present invention so that upon opening of composite construction 10 at central release liner 20, the construction will open at the easier release liner such as, for example, liner 21 and the adjacent adhesive layer 30.

Two pressure sensitive adhesive layers reside upon central release liner 20, that is, one on each side. The first pressure sensitive layer is indicated by the number 30 and is generally the same as the second pressure sensitive layer indicated by the number 35, although they may be different in order to effect a better bond to a specific type of item. Pressure sensitive adhesive layers 30 and 35 generally vary in thickness ranging from about $\frac{1}{2}$ mil to about 4 mils with a desirable thickness ranging from about 1 mil to about 2 mils. A preferred thickness is about $1\frac{1}{2}$ mils. Of course, larger thicknesses can always be used but tend to be uneconomical. Common or conventional pressure sensitive-type adhesives well known to those skilled in the art may be utilized such as an adhesive containing an acrylic base, which may be formulated to any specific purpose, contain flame retardant additives, and the like. Another common class is that of the rubber-based adhesives which may also be formulated with regard to specific purposes and/or uses and, hence, contains dyes, antioxidants, and the like. A specific example of a rubber-based pressure sensitive adhesive is a blend of styrene-butadiene rubber and polyisoprene, and at least a suitable conventional tackifier. Adhesive layers 30 and 35 may be applied to central release liner 20 in any common or conventional manner such as through calendering, coating, or the like.

In order to protect pressure sensitive adhesive layers 30 and 35 during storage, transportation, and the like, or between the time of manufacture and the application to an item or article, two exterior release liners are provided. The first exterior release liner indicated by the numeral 40 is applied to the remaining or exposed surface of first pressure sensitive adhesive layer 30 with a second exterior release liner, indicated by the number 45, being applied to the remaining or exposed side of the second pressure sensitive adhesive layer 35. Exterior release liners 40 and 45 may be constructed of the same material as the central release liner and additionally are of the same thickness as set forth above. Additionally, in order to prevent permanent adhesion or a good bond between the two exterior release liners and the adhesive layers, one side of the exterior liners is coated with a release coating. The release coating may generally be any conventional type of coating, for example, silicone as set forth above with regard to release coatings 21 and 22 and may be very small in thickness, as previously noted. Moreover, release coating 41 which is applied to the first exterior release liner 40 as well as release coating 46 which is applied to the second exterior release liner 45, may be applied in any conventional manner.

The composite pressure sensitive adhesive construction shown in FIG. 1 can be readily made in a manufacturing plant or facility under carefully controlled conditions at ambient temperatures so that good quality is achieved time after time. Moreover, the controlled conditions also insure that no dust, dirt, or contaminates exist between the various adhesive layers and the adjacent layers of material. Additionally, exterior release liners 40 and 45 insure good protection of the adhesive layers. Thus, the quality of the produced item is assured throughout storage, shelf, or warehouse life.

Due to the construction of composite pressure sensitive adhesive laminate 10, it is readily adaptable for application to various items or articles under less than desirable conditions. Generally, composite construction 10 may be utilized to effect joinder or a bond of any two items. The items may be different parts of the same article such as the edges or ends. Additionally, the joinder may be temporary until a permanent joinder is desired, as upon installation in the field or at the job site. Additionally, the embodiment of FIG. 1 can be wound into a roll for easy dispensing and may be held in the roll in any conventional manner, as upon a reel or the like. Similarly, the embodiment of FIG. 2 can also be wound into a roll for easy dispensing in any conventional manner.

FIGS. 3, 4 and 5 show a typical application of a composite pressure sensitive adhesive construction 10 to an article, generally indicated by the numeral 60. In the specific application shown in FIGS. 3 and 5, adhesive construction 10 has been applied to a specific article in the form of an insulating pipe jacket, generally indicated by the numeral 65. Such an application is generally conducted in a factory where the article 60, such as the pipe jacket 65, is manufactured. In such an environment, first exterior release liner 40 can be removed and first pressure sensitive adhesive layer 30 applied to an item such as the edge or end of the article, for example, the longitudinal end or side 67 of the pipe jacket 65. Similarly, second exterior release liner 45 is removed from composite construction 10 and applied to another item such as the remaining edge or longitudinal end or side 68 of the article. Of course, care is taken during the operation to insure that pressure sensitive adhesive layers 30 and 35 are applied to clean, dirt-free surfaces. In such a situation, a temporary bond is formed between the edges of the article herein, the pipe jacket ends, since central differential release liner 20 still releasably separates the first and second adhesive layers. In order to permit facile separation, central release liner 20 generally may extend outwardly beyond the longitudinal cover end of composite construction 10 such as one-half inch or an inch to permit grasping, as by hand. Additionally, it may also extend axially outwardly beyond the pipe jacket as shown in the left portion of FIG. 3, or beyond the other portion, i.e. the right portion of FIG. 3, or any combination thereof including all three portions.

Referring now to FIGS. 3, 4 and 5, a composite pressure sensitive adhesive construction as set forth in FIG. 1 has been applied to pipe insulating jacket 65 in the manner as set forth immediately above. Thus, in this particular application, cover 66 of insulating pipe jacket 65 has one longitudinal end or side 67 which is attached to the other longitudinal end or side 68 through the pressure sensitive adhesive construction. Cover 66 may be made of any conventional material such as Kraft paper, any plastic material such as polyvinylchloride, polyethylene, nylon, polyurethane, and the like. Additionally, depending upon the use of the particular material, cover 66 may also function as a vapor barrier, a liquid barrier, etc. Whenever insulating pipe jacket 65 is to be applied to a pipe 70, the insulating jacket is opened by grasping differential release liner 20 and applying a force thereto, thereby separating one of the adhesive layers from one side of said release liner. As shown in FIG. 4, insulation portion 69 of pipe jacket 65, which may be made out of any suitable insulating material such as polystyrene foam, polyurethane foam, fiberglass, and the like, is placed about pipe 70. Then, differential release liner 20 is completely removed, thereby exposing first pressure sensitive adhesive layer 30 applied to one end of the pipe jacket. Second pressure sensitive adhesive layer 35 is also exposed by the opening of the pipe jacket. Since, until this application, both pressure sensitive adhesive layers have been constantly covered, the two exposed layers are free of contaminates or other foreign matter. The pipe jacket is then closed with one end of the pipe jacket being pressed against the other end to insure a good permanent and secure bond through adhesive layers 30 and 35.

Thus, a permanent bond is quickly and easily effected, is very simple in operation, requires reduced labor and, hence, reduces cost. Additionally, excellent contact is obtained since adhesive layers 30 and 35 are free from contaminates and furthermore, due to the adhesive-adhesive contact, excellent shear is obtained.

In the embodiment shown in FIG. 2, additional layers have been added to effect a cushioned composite construction which is generally indicated by the numberal 75. This construction is similar to that of FIG. 1 in that it contains a central release liner 80 having release coatings 81 and 82 thereon. Desirably, the release coatings have a different tightness so as to form a differential release liner. A second pressure sensitive adhesive layer 90 resides upon one side of release liner 80 with a third pressure sensitive adhesive coating 95 residing on the remaining side. Moreover, a first exterior release liner 100 having a release coating 101 thereon exists on one end of the construction with a second exterior release liner 105 having a release coating 106 thereon consisting of the other end of the construction. The specific types of material utilized for the various release liners, the release coatings, and the pressure sensitive adhesive layers are the same as set forth above with regard to the embodiment shown in FIG. 1 as are the various broad and desirable thicknesses.

To the second pressure sensitive adhesive layer 90 is added a first carrier layer 110 which may be made out of a matted, a non-woven, or fiber material as well as a film. If a film is utilized, it generally may be the same type of material as used in the release liner. However, a soft or cushioned layer is generally preferred and such layers are preferably made out of fibers of polyester, matted polyester fibers, polyvinylchloride film, polyethylene film, a polyolefin film having from 2 to 8 carbon atoms in the repeating unit, and the like. The thickness of this carrier layer generally ranges from $\frac{1}{2}$ mil to about 5 mils with a desirable range being from 2 mils to about 4 mils. Preferred thickness is about 3 mils. A second carrier layer 115 is applied to third adhesive layer 95 and may be made of the same material and may have the same thickness as does the first carrier layer 110.

To the first and second carrier layers 110 and 115 is added another pressure sensitive adhesive layer. Thus, a first pressure sensitive adhesive layer 120 is applied to carrier layer 110 with the first exterior release liner 100 being applied to the first adhesive layer. Similarly, a fourth adhesive layer, 125 is applied to the second carrier layer 115 with the second exterior release liner 105 being applied to the fourth adhesive layer. Adhesive layers 120 and 125 once again can be made from the same adhesive materials as set forth with regard to FIG. 1 and also have the same thicknesses.

The application of a pressure sensitive adhesive construction 75 as set forth in FIG. 2 to an article or item is similar to that set forth in FIG. 1. Thus, the first and second exterior release liners (100 and 105, respectively) are removed with exposed adhesive layers 120 and 125 applied to any portion such as the edges or ends of an item or article. When a permanent bond is desired, a force is applied to differential central release liner 80 to remove the central release liner, then the adhesive laminate or construction is closed and a pressure is applied to the edges or ends of the article to effect a practical permanent bond between adhesive layers 90 and 95. Preferably, a portion of central release liner 80 extends beyond the other layers of the composite pressure sensitive construction 75 so that such portion may be readily grasped. In addition, this embodiment has the same advantages as the embodiment of FIG. 1 in that it is also produced under quality control conditions free from contaminates and the like. This embodiment through additional adhesive layers 120 and 125 as well as the cushioned carriers 110 and 115, thus produces a cushioned adhesive bond. Such a cushioned construction is often desirable to overcome irregularities in the surface to which it is applied, for example, a textured surface.

Referring now to FIG. 6 of the drawings, a self-wound composite pressure sensitive adhesive construction is shown. The self-wound tape roll is a very desirable product in that it can be readily produced, stored, shipped and then utilized by an end user in applying it to his product. As shown in the expanded side view portion of FIG. 6, the construction of the self-wound tape is identical to FIG. 1 except that one of the release liners such as bottom release liner 45 containing release coating 46 thereon, has been removed so that adhesive layer 35 will be attached to the uppermost surface of the tape layer upon which it resides. In order to prevent permanent or a very good adhesion between the adjacent layers of the tape construction, the top surface of the roll, that is, the top surface of release liner 40, contains a thin coating 50 of any conventional or common release agent such as silicone. Thus, the self-wound roll of tape as shown in FIG. 6 may be readily unwound and applied to any article in a manner similar to that of the construction of FIG. 1 except that, of course, one of the adhesive layers is already exposed and may be applied to an item without having to remove any exterior release liner. The types of various materials utilized for the various release liners, the release coatings, and the pressure sensitive adhesive layers are desirably the same as set forth above with regard to the embodiment shown in FIG. 1. Additionally, the various thicknesses are desirably the same as set forth with regard to the discussion of the embodiment of FIG. 1.

Figure 7:
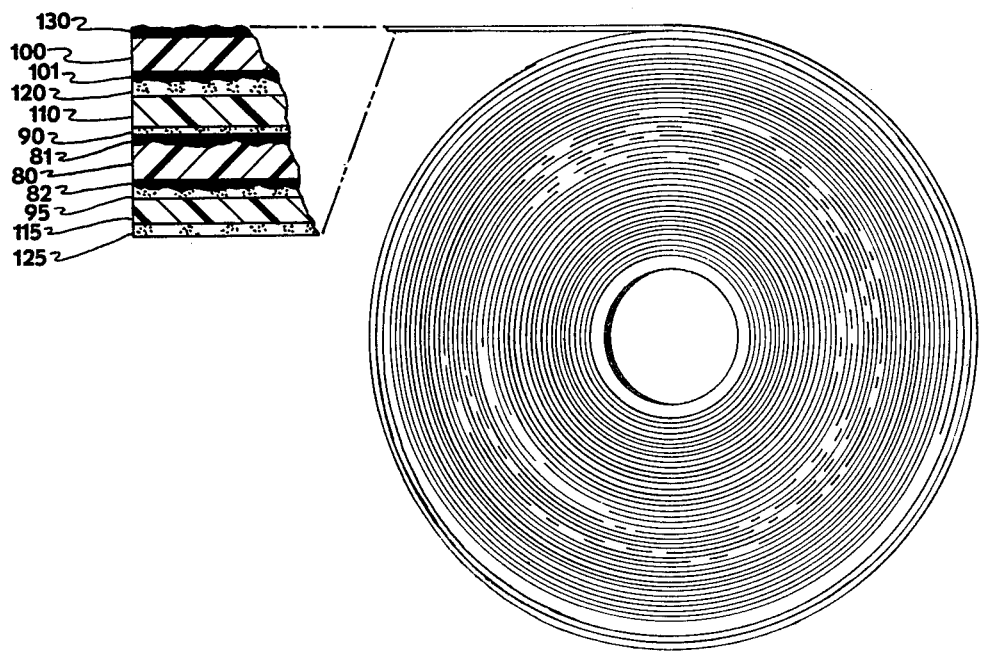
FIG. 7 is an enlarged fragmentary view showing a composite pressure sensitive adhesive construction similar to FIG. 2 in the form of a self-wound roll.

FIG. 7 of the drawings relates to a self-wound composite pressure sensitive adhesive construction wherein only an enlarged portion of the tape is shown. In this embodiment, the construction of the self-wound tape is identical to FIG. 2 except that one of the release liners, such as bottom release liner 105 containing release coating 106 thereon, has been removed so that adhesive layer 125 will be attached to the uppermost surface of the tape upon which it resides. Similarly, in order to prevent a permanent or a good adhesion between the adhesive layers of this tape construction, the top surface of the roll, that is, the top surface of release liner 100, contains a thin coating 130 of any conventional or common release agent such as silicone. As in FIG. 6, the construction of FIG. 7 may be unwound and applied to any article by applying exposed adhesive layer 125 to one item and by removing top exterior release liner 100 and applying the resulting exposed adhesive layer 120 to another item. When a permanent bond is desired, central release liner 80 is removed and adhesive layers 90 and 95 then are contacted with each other. The materials utilized for the various layers are desirably the same as those set forth with regard to the embodiment of FIG. 2 as are the various thicknesses of the individual layers.

Figure 8:
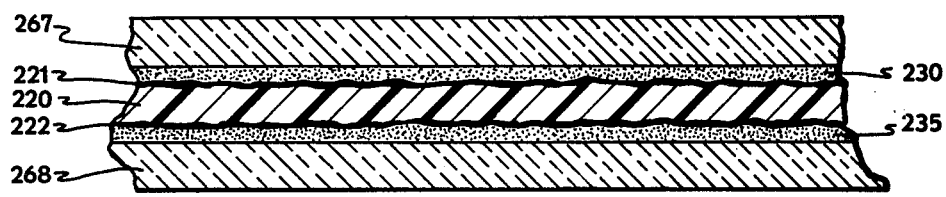
FIG. 8 is an enlarged fragmentary view showing a composite pressure sensitive adhesive construction as attached to the two ends of the jacket cover.
Figure 9:
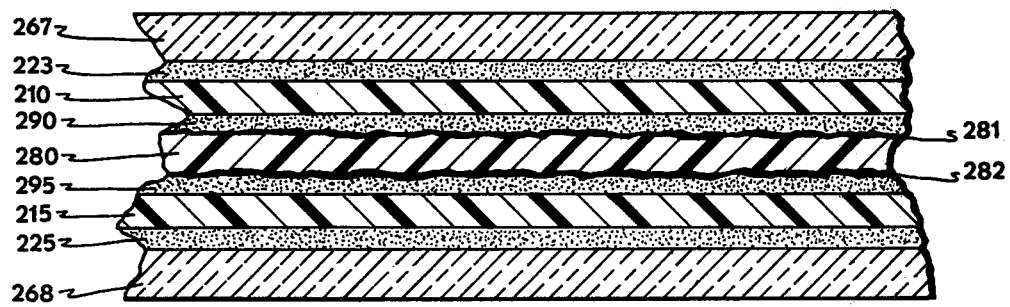
FIG. 9 is an enlarged fragmentary view showing another embodiment of a composite pressure sensitive adhesive construction as attached to the two ends of the jacket cover.

The constituents of the composite pressure sensitive adhesive construction and the method for applying the same may be varied according to the requirements of the particular industrial application, such as seen in FIGS. 8, 9, 10 and 11. In FIGS. 8 and 9, analogous to FIGS. 1 and 2 and the related discussion above, the constituents of the composite pressure sensitive adhesive construction have been reduced without departing from the scope of the invention. When permissable under industry standards for proper application of the adhesive directly to the longitudinal ends or sides of the insulating pipe jacket, the composite pressure sensitive adhesive construction may be reduced in the number of constituents therein. Referring to FIG. 8, pressure sensitive adhesive layer 230 is applied directly to the longitudinal end or side 267 to the jacket. Likewise, a pressure sensitive adhesive layer 235 is applied to the longitudinal end or side 268 of the other portion of the jacket. In order to effect a temporary seal during storage, the central release layer 220 is interposed between pressure sensitive adhesive layers 230 and 235. On both sides of central release layer 220 are release coatings 221 and 222 which permit the removal of central release layer 220 at the appropriate time from the adhesive layers 230 and 235.

At such time when the installation shall occur, the separation of the pipe jacket at release coating 221 or 222 facilitates the removal of central release layer 220 and the interaction of pressure sensitive adhesive layers 230 and 235 to form a permanent bond. Thus, the objects of the invention are accomplished utilizing a composite pressure sensitive adhesive construction which eliminates the need for external release liners by the application of the pressure sensitive material directly to the pipe jacket itself.

Alternatively, as shown in FIG. 9, the central release layer 280 having release coatings 281 and 282 separate pressure sensitive adhesive layers 290 and 295 from sealing permanently.

These adhesive layers 290 and 295 differ from the adhesive layers 223 and 225 firmly secured to longitudinal ends or sides 267 or 268, respectively, in that carrier layers 210 and 215 are interposed to provide a cushioned composite pressure sensitive adhesive construction similar to that described in FIG. 2 above. Once again, the difference of the securement of the pressure sensitive adhesive layers 223 and 225 directly to the pipe jacket accomplishes the objects of the invention without the necessity for any external release liners as provided in other embodiments.

Figure 10:
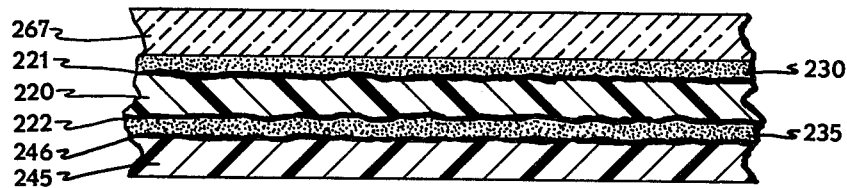
FIG. 10 is an enlarged fragmentary view showing a composite pressure sensitive adhesive construction as attached to one end of the jacket cover.
Figure 11:
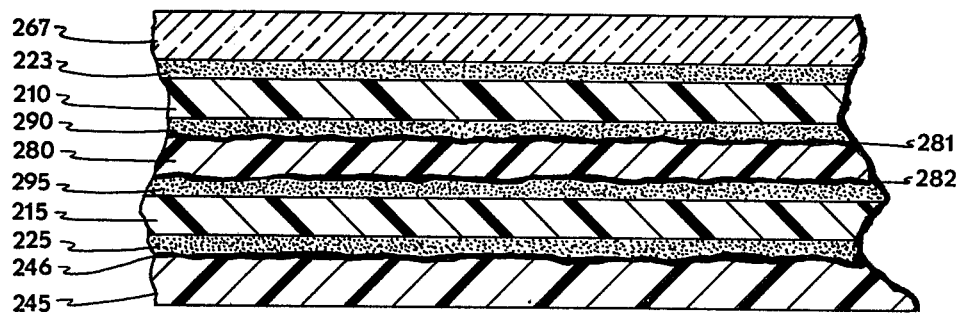
FIG. 11 is an enlarged fragmentary view showing another embodiment of a pressure sensitive adhesive construction as attached to one end of the jacket cover.

A variation of the embodiments expressed in FIGS. 8 and 9 are shown in FIGS. 10 and 11. In these cases, rather than secure pressure sensitive adhesive layers 230 and 235 directly to both longitudinal ends or sides 267 or 268, respectively, one external release liner 245 having release coating 246 is provided on one side of adhesive layer 235, and adhesive layer 230 is secured to longitudinal end or side 267. Therefore, rather than have both adhesive layers 230 and 235 attached to the longitudinal sides 267 and 268 of the jacket, one end is detached therefrom in order that the storage of the jackets need not be done in a cylindrical form. FIG. 10 differs from FIG. 11, in that a single release layer 220 having release coatings 221 and 222 is interposed between adhesive layers 230 and 235 in the former. In the latter, central release layers 280 having release coatings 281 and 282 have pressure sensitive adhesive layers 290 and 295, carrier layers 210 and 215 and pressure sensitive adhesive layers 223 and 225. The additional layers 210, 215, 290 and 295 provide the additional cushioned composite effect which has been analogously described above with reference to the embodiments in FIG. 9 and FIG. 2.

In FIGS. 8 and 9, the pressure sensitive adhesive layers 230 and 235 or 223 and 225 may be applied to the surface of the jacket pipe 267 or 268 according to any method which will adequately secure and adhere the adhesive to the jacket surface. Because adhesive layers 223 and 225 are permanently placed between carrier layers 210 and 215 and jacket surfaces 267 and 268, the adhesive composition need not be pressure sensitive, but may also be any conventional adhesive which permanently secures two materials such as the various structural adhesives which include epoxy, polyurethane, neoprene, nitrile, and silicone-type adhesives. Typically, the application of the adhesive layers to the pipe jacket surfaces may be accomplished by the operations of painting, spraying, rolling, or the like, followed by a drying operation. The application of this operation may occur at any point of manufacture prior to storage and the requirements for the interposition of the central release layer 220 or 280 follow the needs of that for other embodiments discussed above. Because of the composite pressure sensitive adhesive construction is formed in situ between the surfaces of the jacket, the need for a roll as shown in FIGS. 6 and 7 is obviated for the entire composite adhesive construction. However, with reference to the embodiment shown in FIG. 9, alternative forms of construction are available. In the first alternative, the adhesive layer 223 may be applied to the surface 267 of the jacket followed by the application of carrier layer 210, followed by the application of pressure sensitive adhesive layer 290, with the analogous operations occuring for layers 225, 215 and 295. Then, the central release layer 280 having release coatings 281 and 282 may be applied in an identical manner as that described above with reference to FIG. 8.

The second method employs the application of pressure sensitive adhesive layers 223 and 225 to surfaces 267 and 268 of the jacket, followed by application of a sandwich comprising the constituents of carrier layer 210, pressure sensitive adhesive layer 290, central release layer 280 having release coatings 281 and 282, pressure sensitive adhesive layer 295, and carrier layer 215. This intermediate composite construction, once placed between adhesive layers 223 and 225 completes the installation via an alternative method.

With reference to FIGS. 10 and 11, the pressure sensitive adhesive layers 230 and 235 or 223 and 225 my be applied to the surface of the pipe jacket 267 or 268 as has been demonstrated with the embodiments illustrated in FIGS. 8 and 9. Because the adhesive layer 223 is permanently placed between carrier layer 210 and jacket surface 267 with no further need of separation, any adhesive material commonly used in the art may be employed for securing the carrier layers to the jacket pipe surfaces. Because the adhesive layers may be applied by painting, spraying, rolling, or the like, followed by a drying operation, sufficient time must be allocated for these individual operations prior to the time of storage of the pipe jackets for later use. Because the pressure sensitive adhesive layer compositions in FIGS. 10 and 11 do not require ends 267 and 268 to be joined together during storage, alternative methods of storage may be employed than that found with the cylindrical storage requirements of the other embodments. Nevertheless, because the construction is formed in situ between the surfaces of the jacket, the need for the rolls as shown in FIGS. 6 and 7 is eliminated.

In place of applying adhesive layers 235 and 225 to a longitudinal end or side 268 of the pipe jacket, the external release liner 245 is provided to protect the adhesive layers 235 and 225 from debris and the other physical objects which would harm the pressure sensitive qualities of the layer. The external release liner 245 with release coating 246 on the contact side thereof is analogous to external release liner 45 as shown in FIGS. 1 and 2 and releasably attaches to pressure sensitive adhesive layers 235 and 225. With reference to FIG. 11, two alternative methods of construction are available, similar to that found in the embodiments shown in FIG. 9 In the first alternative, layers 223, 210 and 290, liner 280 layers 295, 215, 225, and liner 245 may be applied and secured sequentially in a series of individual processes. The second method employs the application of adhesive layer 223, followed by the securement of an intermediate composite of layers 210 and 290, release liner 280, and layers 295 and 515, followed by application of layer 225 and liner 245. Either process, considering the comparative efficiency of the particular manufacture, may be employed to achieve the same composite pressure sensitive adhesive construction.

After storage, the constructions shown in FIGS. 10 and 11 are taken to the job site and the external release liner 245 is removed such that pressure sensitive adhesive layers 235 and 225 may contact the surface 268 of the pipe jacket. Then, the central release liners 220 and 280 may be removed and adhesive layers 230 and 235 or 290 and 295 may form a bond completing the installation of the pipe jacket around the pipe.

The uses of the composite pressure sensitive adhesive constructions are, of course, numerous. Specific examples include carton sealing, gasket applications, molding (e.g. wood, metal, plastic) applications, temporary template followed by a later permanent bond for a vapor or moisture seal, and any of a myriad of applications wherein a temporary bond may be initially desired followed by a permanent bond such as a process of a temporary assembly of pieces, followed by storage, transportion, etc., and then arrangement into a permanent assembly.

While in accordance with the patent statutes, preferred embodiments have been illustrated and described in detail, it is to be understood that the invention is not limited thereto; the scope of the invention being measured solely by the scope of the attached claims.

What is claimed is:

1. A method of adhering longitudinal side surfaces of an item through a composite pressure sensitive adhesive contruction, comprising the steps of:
    applying a first pressure sensitive adhesive layer to one longitudinal side surface of the item;
    releasably attaching a central release liner to said first pressure sensitive adhesive layer;
    applying a second pressure sensitive adhesive layer to another longitudinal side surface of the item;
    releasably attaching said second adhesive layer to the remaining side of said central release liner to maintain a temporary seal of the item during storage; and
    removing said central release liner and contacting said first pressure sensitive adhesive layer and said second pressure sensitive adhesive layer to form a bond.

2. A method according to claim 1, wherein the steps of applying further comprise the steps of painting and drying said first pressure sensitive adhesive layer to the first item and painting and drying said second pressure sensitive adhesive layer to the other item.

3. A method according to claim 1, wherein the steps of applying further comprise the steps of spraying and drying said first pressure sensitive adhesive layer to the first item and spraying and drying said second pressure sensitive adhesive layer to the other item.

4. A method according to claim 1, wherein the steps of applying further comprise the steps of rolling and drying said first pressure sensitive adhesive layer to the first item and rolling and drying said second pressure sensitive adhesive layer to the other item.

5. A method of adhering one item to another item through a composite pressure sensitive adhesive construction, comprising the steps of:
    applying a first adhesive layer to one item;
    securing a carrier cushion layer to said first adhesive layer;
    applying a second pressure sensitive adhesive layer to said carrier cushion layer;
    releasably attaching a central release liner to said second adhesive layer;
    applying a fourth adhesive layer to another item;
    securing a second carrier cushion layer to said fourth adhesive layer;
    applying a third pressure sensitive adhesive layer to said second carrier layer, said third pressure sensitive adhesive layer releasably attached to said central release liner; and
    removing said central release liner and contacting said second pressure sensitive adhesive layer with said third pressure sensitive adhesive layer to form a bond.

6. A method according to claim 5, wherein the steps of applying further comprise the steps of painting and drying said first adhesive layer to the first item, painting and drying said second pressure sensitive adhesive layer to said first carrier cushion layer, painting and drying said third pressure sensitive adhesive layer to said second carrier cushion layer, and painting and drying said fourth adhesive layer to the other item.

7. A method according to claim 5, wherein the steps of applying further comprise the steps of spraying and drying said first adhesive layer to the first item, spraying and drying said second pressure sensitive adhesive layer to said first carrier cushion layer, spraying and drying said third pressure sensitive adhesive layer to said second carrier cushion layer, and spraying and drying said fourth adhesive layer to the other item.

8. A method according to claim 5, wherein the steps of applying further comprise the steps of rolling and drying said first adhesive layer to the first item, rolling and drying said second pressure sensitive adhesive layer to said first carrier cushion layer, rolling and drying said third pressure sensitive adhesive layer to said second carrier cushion layer, and rolling and drying said fourth adhesive layer to the other item.

9. A method of adhering one item to another through a composite pressure sensitive adhesive construction, comprising the steps of:
    applying a first adhesive layer to one item;
    applying a fourth adhesive layer to another item;
    applying a second pressure sensitive adhesive layer to a carrier layer and a central release liner, one side of said second pressure sensitive adhesive layer attached to said carrier layer and the remaining side of said second pressure sensitive adhesive layer releasably attached to said central release liner;
    applying a third pressure sensitive adhesive layer to said central release liner and a second carrier layer, one side of said third pressure sensitive adhesive layer attached to said second carrier layer and the remaining side of said third pressure sensitive adhesive layer releasably attached to said central release liner to form an intermediate composite pressure sensitive adhesive construction;
    securing said intermediate pressure sensitive adhesive construction to said first adhesive layer and said fourth adhesive layer; and removing said central release liner and contacting said second pressure sensitive adhesive layer with said third pressure sensitive adhesive layer to form a bond.

10. A method according to claim 9, wherein the steps of applying further comprise the steps of painting and drying said first adhesive layer to the first item, painting and drying said second pressure sensitive adhesive layer to said first carrier layer and said central release liner, painting and drying said third pressure sensitive adhesive layer to said central release liner and said second carrier layer, and painting and drying said fourth adhesive layer to the other item.

11. A method according to claim 9, wherein the steps of applying further comprise the steps of spraying and drying said first adhesive layer to the first item, spraying and drying said second pressure sensitive adhesive layer to said first carrier layer and said central release liner, spraying and drying said third pressure sensitive adhesive layer to said central release liner and said second carrier layer, and spraying and drying said fourth adhesive layer to the other item.

12. A method according to claim 9, wherein the steps of applying further comprise the steps of rolling and drying said first adhesive layer to the first item, rolling and drying said second pressure sensitive adhesive layer to said first carrier layer and said central release liner, rolling and drying said third pressure sensitive adhesive layer to said central release liner and said second carrier layer, and rolling and drying said fourth adhesive layer to the other item.

13. A method according to claims 1, 5, or 9, wherein said central release liner has a release coating on each side thereof, whereby said releasable attachment is obtained.

14. A method according to claims 5 or 9, wherein said first adhesive layer and said fourth adhesive layer are composed of pressure sensitive adhesive material.

15. A method of adhering one item to another through a composite pressure sensitive construction, comprising the steps of:
applying a first pressure sensitive adhesive layer to one item;
releasably attaching a central release liner to said first pressure sensitive adhesive layer;
applying a second pressure sensitive adhesive layer to said central release liner;
releasably attaching an external release liner on its contact side to said second pressure sensitive adhesive layer to protect the composite pressure sensitive adhesive construction during storage;
removing said external release liner and contacting said second pressure sensitive adhesive layer to another item; and
removing said central release liner and contacting said first pressure sensitive adhesive layer and said second pressure sensitive adhesive layer to form a bond.

16. A method according to claim 15, wherein the steps of applying further comprise the steps of painting and drying said first pressure sensitive adhesive layer to the first item and painting and drying said second pressure sensitive adhesive layer to said central release liner.

17. A method according to claim 15, wherein the steps of applying further comprise the steps of spraying and drying said first pressure sensitive adhesive layer to the first item and painting and drying said second pressure sensitive adhesive layer to said central release liner.

18. A method according to claim 15, wherein the steps of applying further comprise the steps of rolling and drying said first pressure sensitive adhesive layer to the first item and rolling and drying said second pressure sensitive adhesive layer to said central release liner.

19. A method of adhering one item to another through a composite pressure sensitive adhesive construction, comprising the steps of:
applying a first adhesive layer to one item;
securing a carrier cushion layer to said first adhesive layer;
applying a second pressure sensitive adhesive layer to said carrier cushion layer;
releasably attaching a central release liner to said second pressure sensitive adhesive layer;
applying a third pressure sensitive adhesive layer to said central release liner;
securing a second carrier cushion layer to said third pressure sensitive adhesive layer;
applying a fourth pressure sensitive adhesive layer to said second carrier cushion layer;
releasably attaching an external release liner on its contact side to said fourth pressure sensitive adhesive layer to protect the composite pressure sensitive adhesive construction during storage;
removing said external release liner and contacting said fourth pressure sensitive adhesive layer to another item; and
removing said central release liner and contacting said second pressure sensitive adhesive layer and said third pressure sensitive adhesive layer to form a bond.

20. A method according to claim 19, wherein the steps of applying further comprise the steps of painting and drying said first adhesive layer to the first item, painting and drying said second pressure sensitive adhesive layer to said first carrier cushion layer, painting and drying said third pressure sensitive adhesive layer to said central release liner, and painting and drying said fourth pressure sensitive adhesive layer to said second carrier cushion layer.

21. A method according to claim 19, wherein the steps of applying further comprise the steps of spraying and drying said first adhesive layer to the first item, spraying and drying said second pressure sensitive adhesive layer to said first carrier cushion layer, spraying and drying said third pressure sensitive adhesive layer to said central release liner, and spraying and drying said fourth pressure sensitive adhesive layer to said second carrier cushion layer.

22. A method according to claim 19, wherein the steps of applying further comprise the steps of rolling and drying said first adhesive layer to the first item, rolling and drying said second pressure sensitive adhesive layer to said first carrier cushion layer, rolling and drying said third pressure sensitive adhesive layer to said central release liner, and rolling and drying said fourth pressure sensitive adhesive layer to said second carrier cushion layer.

23. A method of adhering one item to another through a composite pressure sensitive adhesive construction, comprising the steps of:
applying a first adhesive layer to one item;
applying a second pressure sensitive adhesive layer to a carrier layer and a central release liner, one side of said second pressure sensitive adhesive layer attached to said carrier layer and the remaining side of said second pressure sensitive adhesive layer releasably attached to said central release liner, applying a third pressure sensitive adhesive layer to said central release liner and a second carrier layer, one side of said third pressure sensitive adhesive layer attached to said second carrier layer and the remaining side of said third pressure sensitive adhesive layer releasably attached to said central release liner to form an intermediate composite pressure sensitive adhesive construction;

securing said intermediate composite pressure sensitive adhesive construction to said first adhesive layer;

applying a fourth pressure sensitive adhesive layer to the remaining side of said second carrier layer;

releasably attaching an external release liner on its contact side of said fourth pressure sensitive adhesive layer to protect the composite pressure sensitive adhesive construction during storage; and removing said external release liner and contacting said fourth pressure sensitive adhesive layer with another item; and removing said central release liner and contacting said second pressure sensitive adhesive layer with said third pressure sensitive adhesive layer to form a bond.

24. A method according to claim 23, wherein the steps of applying further comprise the steps of painting and drying said first adhesive layer to the first item, painting and drying said second pressure sensitive adhesive layer to said first carrier layer and said central release liner, painting and drying said third pressure sensitive adhesive layer to said central release liner and said second carrier layer, and painting and drying said fourth pressure sensitive adhesive layer to said second carrier layer.

25. A method according to claim 23, wherein the steps of applying further comprise the steps of spraying and drying said first adhesive layer to the first item, spraying and drying said second pressure sensitive adhesive layer to said first carrier layer and said central release liner, spraying and drying said third pressure sensitive adhesive layer to said central release liner and said second carrier layer, and spraying and drying said fourth pressure sensitive adhesive layer to said second carrier layer.

26. A method according to claim 23, wherein the steps of applying further comprise the steps of rolling and drying said first adhesive layer to the first item, rolling and drying said second pressure sensitive adhesive layer to said first carrier layer and said central release liner, rolling and drying said third pressure sensitive adhesive layer to said central release liner and said second carrier layer, and rolling and drying said fourth pressure sensitive adhesive layer to said second carrier layer.

27. A method according to claims 15, 19, or 23 wherein said central release liner has a release coating on each side thereof, and wherein said external release liner has a release coating on said contact side releasably attached to said fourth pressure sensitive adhesive layer.

28. A method according to claims 19 or 23, wherein said first adhesive layer is composed of pressure sensitive adhesive material.

29. A composite pressure sensitive adhesive construction, comprising:
(a) a pressure sensitive adhesive layer;
(b) a central release liner having two sides;
(c) a second pressure sensitive adhesive layer;
(d) an exterior release liner having a contact side; and
(e) a longitudinal side surface of an item;

said first pressure sensitive adhesive layer attached to said longitudinal side surface of said item;

one side of said central release liner releasably attached to said first pressure sensitive adhesive layer and the remaining side of said central release liner releasably attached to said second pressure sensitive adhesive layer; and said contact side of said exterior release liner releasably attached to said second pressure sensitive adhesive layer.

30. A composite pressure sensitive adhesive construction, according to claim 29, wherein both said sides of said central release liner and said contact side of said exterior release liner have a release coating thereon.

31. A composite pressure sensitive adhesive construction according to claim 30, wherein the thickness of said central release liner and said exterior release liner ranges from about ½ mil to about 6 mils; and wherein the thickness of said first and said second pressure sensitive adhesive layer ranges from about 178 mil to about 4 mils.

32. A composite pressure sensitive adhesive construction according to claim 31, wherein the thickness of said central release liner and said exterior release liner ranges from about 3 mils to about 4 mils; and wherein the thickness of said first and said second pressure sensitive adhesive layer ranges from about 1 mil to about 2 mils.

33. A composite pressure sensitive adhesive construction, according to claim 31, wherein said central release liner and said exterior release liner are made from a material selected from the class consisting of Super Calender Kraft Paper, polyethylene-coated Kraft paper, polyethylene film, polyester film, polyvinylchloride film, and polypropylene film, said first pressure sensitive adhesive layer and said second pressure sensitive adhesive layer is made from a material selected from the class consisting of an acrylic-based adhesive and a rubber-based adhesive, and said release coating is made from a silicone material.

34. A composite pressure sensitive adhesive construction, according to claim 31, wherein one release coating on said central release liner has a tighter release than the remaining release coating so that a differential central release liner exists.

35. A composite pressure sensitive adhesive construction comprising:
(a) a first adhesive layer;
(b) a carrier layer having two sides;
(c) a second pressure sensitive adhesive layer;
(d) a central release liner having two sides;
(e) a third pressure sensitive adhesive layer;
(f) a second carrier layer having two sides;
(g) a fourth pressure sensitive adhesive layer;
(h) an exterior release liner have a contact side; and
(i) a longitudinal side surface of an item;

said first pressure sensitive adhesive layer attached to said longitudinal side surface of said item;

one side of said first carrier layer attached to said first adhesive layer and the remaining side of said first carrier layer attached to said second pressure sensitive adhesive layer;

one side of said central release liner releasably attached to said second pressure sensitive adhesive layer and the remaining side of said central release liner releasably attached to said third pressure sensitive adhesive layer;

one side of said second carrier layer attached to said third pressure sensitive adhesive layer and the remaining side of said second carrier layer attached to said fourth pressure sensitive adhesive layer; and said contact side of said exterior release liner releasably attached to said fourth pressure sensitive adhesive layer.

36. A composite pressure sensitive adhesive construction, according to claim 35, wherein both said sides of said central release liner and said contact side of said exterior release liner have a release coating thereon.

37. A composite pressure sensitive adhesive construction, according to claim 36, wherein the thickness of said central release liner and said exterior release liner ranges from about ½ mil to about 6 mils, and the thickness of said first, said second, said third, and said fourth adhesive layers ranges from about ½ mil to about 4 mils; and the thickness of said first and said second carrier ranges from about ½ mil to about 5 mils.

38. A composite pressure sensitive adhesive construction, according to claim 37, wherein the thickness of said exterior release liner and said central release liner ranges from from about 3 mils to about 4 mils, the thickness of said first, said second, said third and said fourth adhesive layers ranges from about 1 mil to about 2 mils, and the thickness of said first carrier and said second carrier ranges from about 2 mils to about 4 mils.

39. A composite pressure sensitive adhesive construction, according to claim 37, wherein said central release liner and said exterior release liner is made from a material selected from the class consisting of Super Calendered Kraft paper, polyethylene-coated Kraft paper, polyethylene film, polyester film, polyvinylchloride film, and polypropylene film, said first adhesive layer is made from a material selected from the class consisting of an acrylic-based adhesive, a rubber-based adhesive, an epoxy resin adhesive, a silicone-based adhesive, a polyurethane-based adhesive, a neoprene-based adhesive, and a nitrile-based adhesive;

said second pressure sensitive adhesive, said third pressure sensitive adhesive, and said fourth pressure sensitive adhesive layers are made from a material selected from the class consisting of an acrylic-based adhesive and a rubber-based adhesive, said release coatings are made from a silicone material; and said carrier layer is made from a material selected from the class consisting of a non-woven polyester, matted polyester fibers, polyvinylchloride film, polyethylene film, and a polyolefin film having from 2 to about 8 carbon atoms in the repeating unit.

40. A composite pressure sensitive adhesive construction according to claim 37, wherein one of the release coatings attached to said central release liner has a greater tightness than the remaining release coating so that said second or said third adhesive layers are more tightly bound to said central release liner to effect a differential release liner.

* * * * *